July 12, 1932. C. C. McMULLIN 1,866,816
FRICTION BRAKE
Filed May 17, 1930
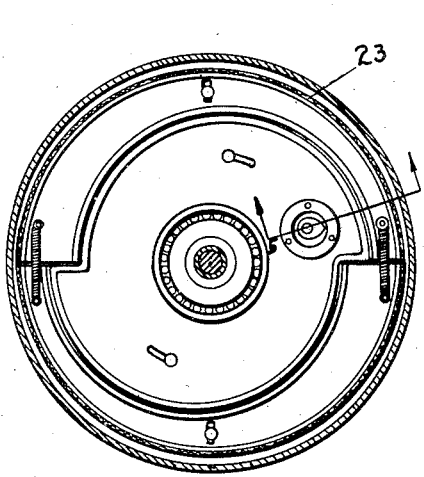
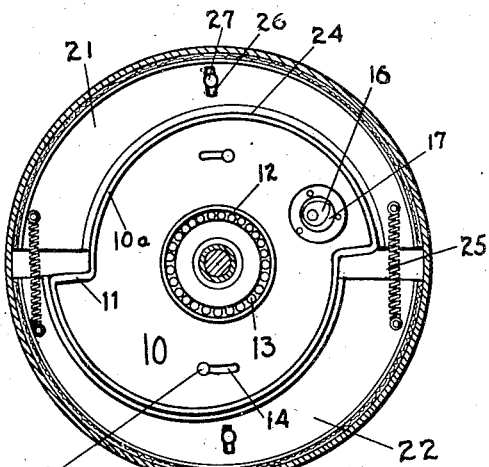
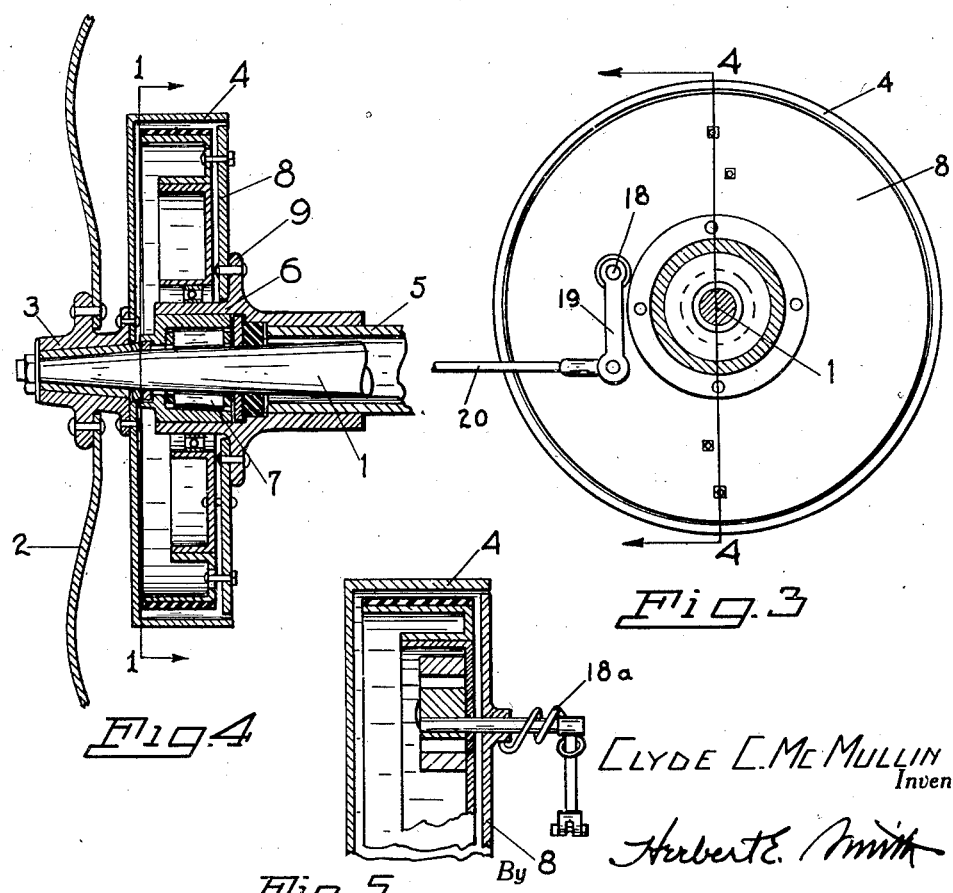
Clyde C. McMullin
Inventor
Herbert E. Smith
Attorney Patented July 12, 1932

1,866,816

UNITED STATES PATENT OFFICE

CLYDE C. McMULLIN, OF LOON LAKE, WASHINGTON

FRICTION BRAKE

Application filed May 17, 1930. Serial No. 453,191.

My present invention relates to improvements in friction brakes of the type adapted for use upon wheels of automotive vehicles, in connection with the brake drums carried with the wheels. In connection with the drum I utilize an inner, expanding-double-cam disk and a pair of complementary brake shoes for applying the frictional contact to the drum, and the parts are so combined as to assure a maximum friction surface in the brake with a minimum of power expended for applying the brake.

The invention consists in certain novel combinations and arrangements of parts as will hereinafter be more fully set forth and claimed. In the accompanying drawing I have illustrated one complete example of the physical embodiment of my invention wherein the parts are combined and arranged according to the best mode I have thus far devised for the practical application of the principles of my invention.

Figure 1 is a sectional view of the brake at line 1—1 of Figure 4, with the brake released.

Figure 2 is a view similar to Figure 1, but with the brake applied.

Figure 3 is an inner face view of the brake device, showing the stationary tubular axle and part of a rear shaft of an automobile in section.

Figure 4 is a transverse sectional view at line 4—4 of Figure 3.

Figure 5 is a detail sectional view of the brake actuating cam, as at line 5—5 of Figure 1.

In order that the general arrangement and relation of parts may readily be understood I have shown the journal end of the rear shaft 1 of an automotive vehicle, together with a portion of a disk wheel 2 with its flanged hub 3 to which the usual type of brake drum 4 is firmly secured to revolve with the wheel.

The rear shaft is journaled in the usual tubular, non-rotary axle 5, and the end of the axle is fashioned with a bearing cup 6 for the roller bearing 7 between the journal and the axle.

At the inner open side of the brake drum, and supported on the tubular axle is a circular plate 8 that is attached as by rivets or bolts to the flange 9 of the axle, and this plate, which is provided with an open center to fit over the bearing cup, is utilized to support the working parts of the brake within the drum.

A brake operating disk 10 having two complementary cams 10a, and a pair of radial shoulders 11, together with a center bearing ring 12 about the open center of the disk is mounted to turn slightly on the plate. As an anti-friction device, and to maintain the proper relation between the revolving or oscillatable disk and the stationary bearing cup 6 of the tubular shaft, I provide a ball bearing 13 between these parts so that a minimum expenditure of power is required for turning the cam disk when the brake is to be applied.

The turning movement of the disk is limited by the use of a pair of arcuate slots 14 in the disk and pins 15 that are secured to the plate 8 and project through the slots.

The operating disk is turned through the instrumentality of an actuating cam or eccentric 16 that turns within a circular opening 17 in the disk, the eccentric or cam being in frictional contact with the wall of the circular opening.

The cam is mounted on a shaft 18 that is eccentrically arranged in the opening of the disk and journaled in the plate 8, with a return spring 18a coiled about the shaft with one end engaging the plate and the other end engaging a link or crank arm 19 that is fixed on the end of the shaft. By means of a brake rod 20 pivoted to the crank arm, and suitable connections, (either manually or mechanically operated) the crank arm is swung to turn the shaft in the application of the brake shoes 21 and 22.

These brake shoes, which are provided with linings 23, are located between the inner periphery of the brake drum and the cam faces 10a of the cam disk, and the brake shoes have each an inner cam face as 24 complementary to the cam faces 10a of the disk.

The shoes are slightly less than 180 degrees, so that a slight space exists between ends of adjoining shoes when the latter are expanded to braking position in Figure 2, and after the disk is released a pair of springs 25 draw the shoes together to position of Figure 1 where the ends of the two shoes engage the shoulders of the disk. The springs thus normally hold these ends against the shoulders to prevent chattering and to assure that the disk when it is turned will expand the shoes without lost motion.

Each shoe is fashioned with a radial slot 26 and a retaining and guide pin 27, on the plate, passes through the slot, and guides the outward and inward movement of the shoe.

As thus described and illustrated it will be apparent that I have provided a quick acting brake device having a maximum friction surface and utilizing only a minimum in expenditure of power for applying the brake.

Having thus fully described my invention, what I claim as new and desire to secure by Letters Patent is:—

The combination with a brake drum and a stationary plate, of an oscillatable, slotted, disk having a pair of opposed peripheral cams forming diametrically extending shoulders, of a pair of slotted brake shoes having angular ends complementary to said shoulders, guide pins on the plate for the slotted disk and slotted brake shoes, said shoes having outer friction faces for engagement with the drum and inner cam faces complementary to the disk-cams, springs connecting adjoining ends of the shoes for holding them in contact and for holding the shoes in contact with the shoulders when the shoes are retracted, a cam shaft journaled in the plate and disposed eccentrically in a circular opening of the disk, a cam on the shaft for co-action with the walls of the opening, and means for turning the cam shaft.

In testimony whereof I affix my signature.

CLYDE C. McMULLIN.